Figure 1:
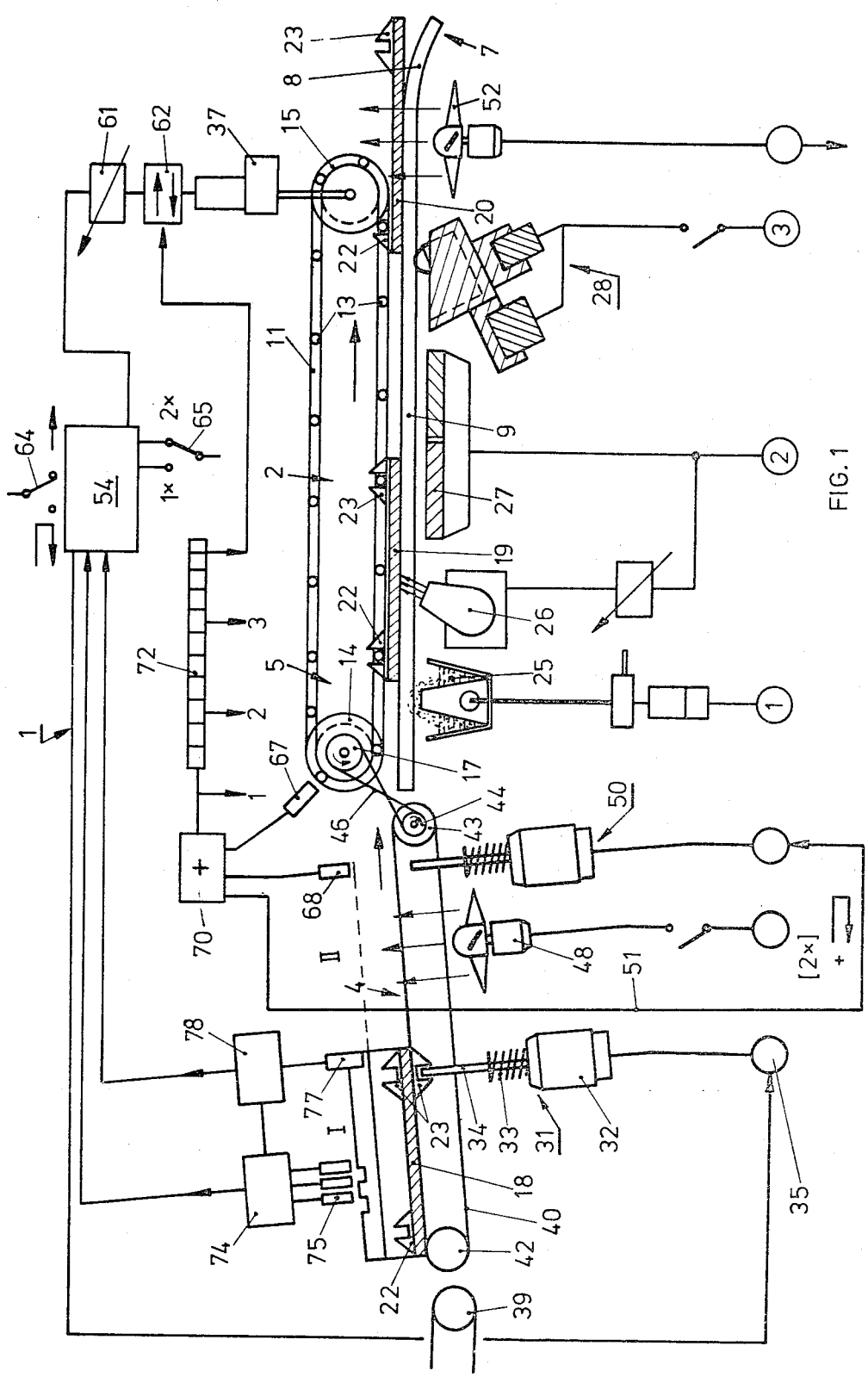

United States Patent [19]

Flury

[11] 4,363,434

[45] Dec. 14, 1982

[54] CONTINUOUS SOLDERING INSTALLATION

[76] Inventor: Karl Flury, Bergstr. 61, 8953 Dietikon, Switzerland

[21] Appl. No.: 114,152

[22] Filed: Jan. 22, 1980

[30] Foreign Application Priority Data

Jan. 23, 1979 [CH] Switzerland .......................... 642/79

[51] Int. Cl.³ ...................... H05K 03/34; B23K 03/00
[52] U.S. Cl. ......................................... 228/7; 198/341;
198/492; 228/10; 228/37; 228/47; 228/56.5;
228/180 R
[58] Field of Search ........................ 228/7, 8, 9, 10, 46,
228/47, 33, 36, 37, 56.5, 102, 103, 180 R, 200;
198/341, 460, 577, 492

[56] References Cited

U.S. PATENT DOCUMENTS

| 3,041,991 | 7/1962 | Dvork | 228/180 X |
| 3,092,059 | 6/1963 | Tesch, Jr. | 228/180 X |
| 3,112,723 | 12/1963 | Potocki | 228/10 |
| 3,386,166 | 6/1968 | Tardoskegyi | 228/36 X |
| 3,604,611 | 9/1971 | Lamberty | 228/36 |

FOREIGN PATENT DOCUMENTS

| 2446702 | 5/1975 | Fed. Rep. of Germany | 198/492 |
| 523734 | 7/1972 | Switzerland . | |
| 555213 | 10/1974 | Switzerland . | |

*Primary Examiner*—Gus T. Hampilus
*Attorney, Agent, or Firm*—Lawrence Rosen

[57] ABSTRACT

A soldering installation (1) is provided for run-through and shuttle operation, in particular for the run-through soldering of printed circuit boards on a soldering machine. It is equipped with a feeder mechanism (4) for the transport of soldering frames (18) to which printed circuit boards are fixed. The feeder mechanism (4) has a travel distance of at least 2 frames. In the first half of the feeder mechanism (4) is a device (31) for the holding of a frame (18) as well as an activator (32) for the release of the frame (18). A transport mechanism, (5) running synchronously with the feeder mechanism (4) bridges the soldering machine. An electric motor (37) with adjustable speed and reversibility drives these parts (4 and 5). A program control sttion (54) with memory register (72) and sensors (67) controls the switching on and off of parts of the installation in such a way that with run-through operating the frame holding station (31) secures the maintenance of a minimum distance from frame to frame on the frame transport mechanisms and also activates and terminates the operation of the fluxer (25), the dryer/preheater (26, 27) and the soldering station (28) during the passage of a frame. This soldering installation is sensibly equipped to handle small as well as large numbers of printed circuit boards to be soldered, because it is equipped for shuttle operation as well as, in the case of peak loads, run-through, unidirectional operation, and is also capable of being integrated into a production line.

4 Claims, 3 Drawing Figures

CONTINUOUS SOLDERING INSTALLATION

The hereby described invention concerns a soldering installation for unidirectional through-processing and "through and back" operation, in particular for the through-processing and soldering of printed circuit boards by the employment of a soldering machine, as well as a set of procedures for operation.

Soldering installations are known which are designed and built as simple so called continuous processing (unidirectional) through-put installations. Here the printed circuit boards to be soldered are fixed in so called soldering frames, fed in at one end of the installation and removed at the other after being soldered. These soldering installations have such a high capacity, that the utilization, even in large factories, amounts to about 10%. This is economically uninteresting, since such through-processing machines have a power requirement of up to 12 kw and, with the above mentioned low utilization, waste about 10 kw. The alteration of the soldering parameters i.e. conveyor speed to preheat power ratio is, with these machines, difficult and can only be performed by trained personnel.

Other types of soldering installations are also known, with which the printed circuit boards to be soldered are fed in at one side of the soldering installation, and then return, after being soldered, to the starting position in order to save labor. Such soldering installations have a capacity which amount to about 25-50% of those of a straight through-put processing machine. Furthermore, soldering experts are aware of the fact that printed circuit boards or components which were stored for a long time prior to soldering achieve only bad connections in the first soldering process and are acceptably soldered only after being soldered a second time.

Since a short time ago wires have become available for soldering without stripping which allow soldering at a solder temperature of about 260°–280° C. When these are used, the first pass burns off the insulation, and only the second pass accomplishes the actual soldering.

The electronics industry, however, is without a machine which is suitable for small as well as large quantities of printed circuit boards to be soldered; which is suited—in other words—as well for the "shuttle" operation as the continuous straight through-put type of operation for peak loads, and which can be integrated into a production line, and is programmable to solder selected frames twice without the aid of complicated mechanical auxiliary equipment.

The hereby described invention aims to create such a soldering installation.

This installation is characterized by a feeder mechanism for soldering frames which hold printed circuit boards, and has a transport range (length) at least two frames long; by a fixture for the holding of frames mounted in the first part of the feeder mechanism, a trigger for the release of the frame, by a transfer mechanism traversing or bridging the soldering machine running synchronously with the feeder mechanism; by an electric motor propelling one of these two parts, controllable by a program control and with variable speed and reversible, characterized also by means for the controlled switching on and off or parts of the installation, the whole arranged in such a way that with a straight run-through type of processing, the frame holding mechanism assures the maintenance of a minimum distance from frame to frame on the transport train for the soldering frames.

Such a soldering installation is a universal installation. A model of the object of this invention will be explained with the aid of a drawing.

Shown are:

FIG. 1 A schematic representation of a soldering installation for straight run-through and shuttle as well as double soldering operation, with the individual mechanisms and their control elements shown.

Figure 2:
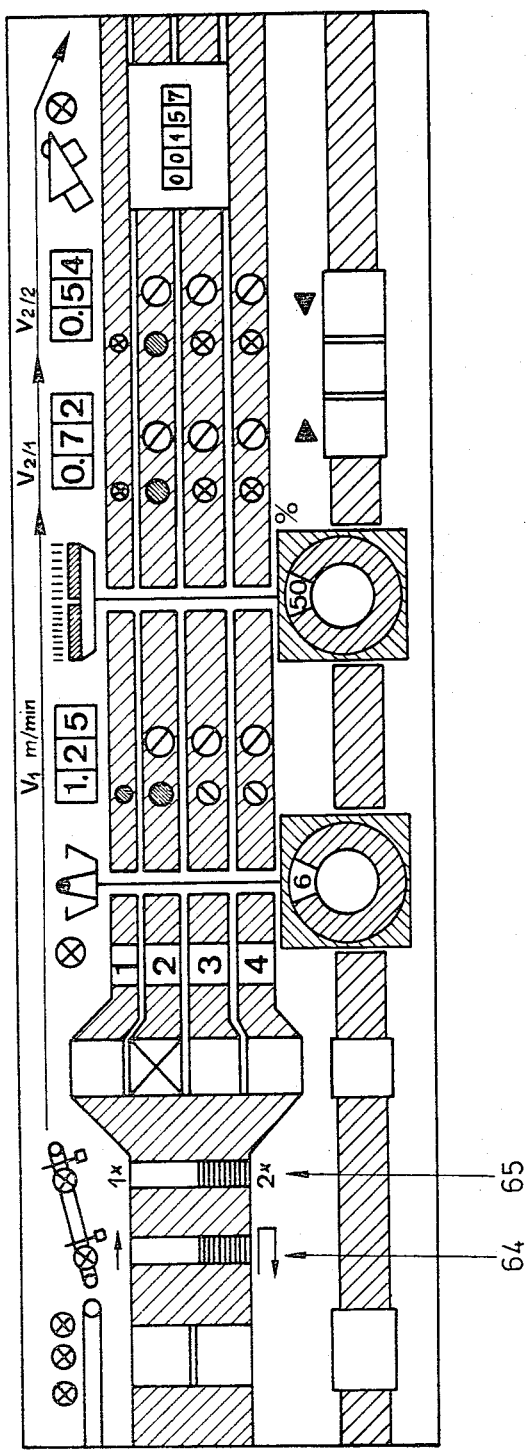

FIG. 2 A representation of a switchboard for a soldering installation as per FIG. 1.

Figure 3:
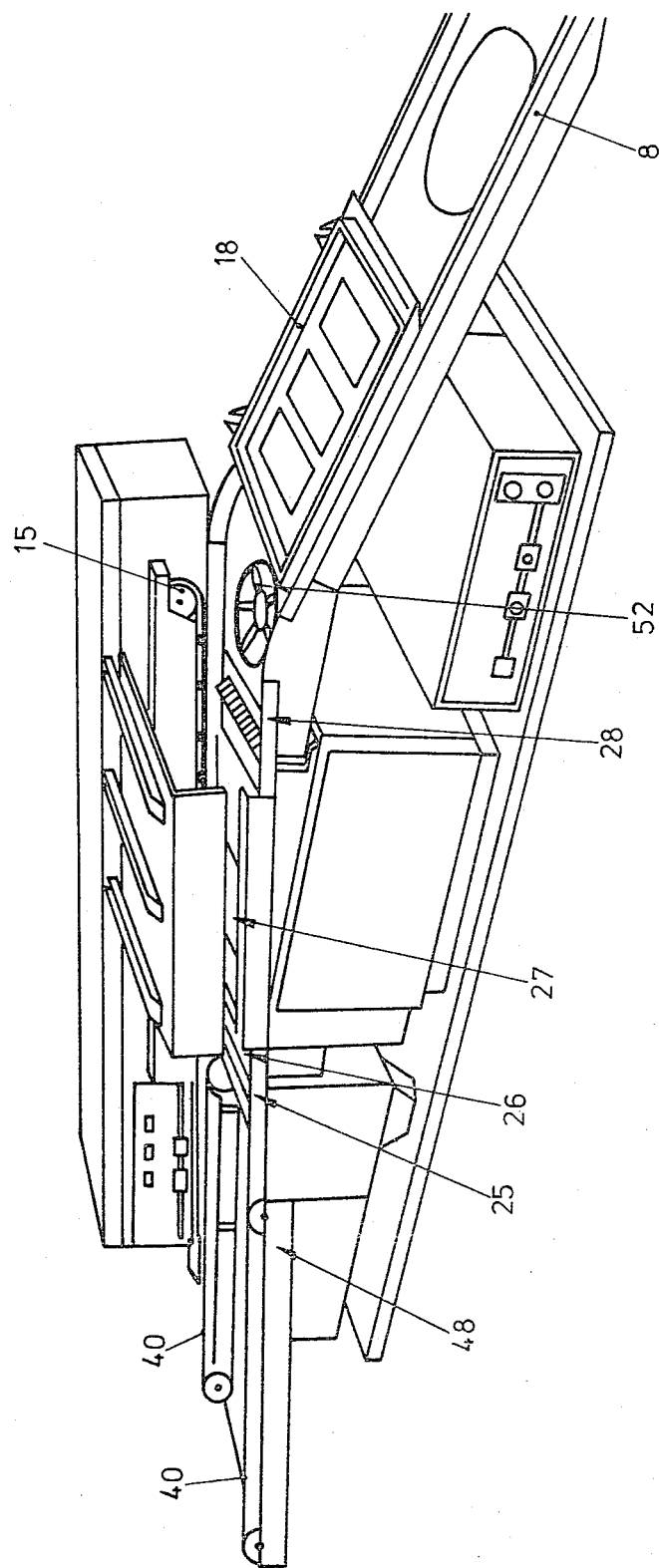

FIG. 3 The soldering installation according to FIG. 1 and FIG. 2 in operating position and shown in perspective.

In FIG. 1 a soldering installation for the soldering of printed circuit boards is shown. This soldering installation encompasses a soldering machine 2. In front of this there is a feeder apparatus 4. Above the soldering machine is a transport device 5. At the end of the soldering machine 2 there is a discharge mechanism 7. This discharge apparatus is conceived as a slide chute 8.

Above soldering machine 2 are two rail guides 9, and mounted off to one side of this machine there is a transport mechanism in the form of a gear belt 11, which is equipped with transport pegs or dogs 13 protruding to one side. (FIG. 3) The belt 11 runs over two gears 14 and 15. The shaft for gear 14 also has a belt pulley 17 attached.

The printed circuit boards to be soldered or already soldered are situated or fixed in frames 18, 19 and 20. Each of these frames 18, 19, 20 at the front and rear thereof is equipped with engaging latches 22, respectively.

The soldering machine is equipped with a fluxer 25, followed by a dryer 26, a preheater 27 and the actual soldering station 28, and amounts to a model which represents the state of the art. The soldering station is preferably an electrodynamic soldering pump of a type disclosed in Swiss patents 523,734 and 555,213, which can be switched on and off electronically without time lag. The feeder mechanism 4 is equipped with a locking bar 31 with preferably a magnetic activator or trigger 32, a spring 33 and a bolt 34. A control circuit 35 supplies the activator with control current. As is evident from FIG. 1, the printed circuit boards are delivered to the conveyor belt 40 belonging to the feeder mechanism 4 by conveyor belt 39 or by hand. The conveyor belt 40 runs over two rollers with a belt pulley 44, which is connected via a belt 46 with the gear belt 11 of the transport installation 5 for its drive power. The feeder mechanism is further equipped with a cooling blower 48, behind which is another locking bar 50, which is built exactly like locking bar 31. It is controlled via control circuit 51.

At the end of the transport mechanism 5 another cooling fan 52 is mounted.

Furthermore, a program control station or unit 54 is provided, the appearance of which is shown basically by FIG. 2. This station 54 incorporates basically a speed (RPM) regulator 61 with preselectable speed sequences ($V_1$=fluxer, dryer/preheater speed, $V_{2/1}$ first soldering speed, $V_{2/2}$ second soldering speed used for double-soldering, these sequences being selectable by pushbuttons arranged in a vertical row and bearing the numbers 1, 2, 3 and 4, with number 1 being at the top of the row and number 4 being at the bottom of the row or automatically by a code strip on the soldering frames and a reversing control 62 for the regulation of the drive motor 37 for the transfer device 5 and via the belt 46 for the feeder mechanism 4. The program control station further contains a "run through"-"reverse" switch 64 as well as a switch for control or selection of single or double soldering 65.

Control via switch 64 determines whether the soldering installation operates according to the "run-through" system or according to the shuttle system (back and forth) according to the open position of switch 62, switch 65 determines whether a soldering process on a printed circuit board is performed only once or twice.

A synchronization sensor 67 reports each passing of a transport peg or dog 13. The sensor 68 reports the presence of a frame 18, 19, 20 at the locking bar 50. The addition of these signals is performed in the control station 70, so that the stopping bolt 50 deactivates via the control circuit 51 as soon as the frame and transport peg are in the proper juxtaposition, and the frame is released for further processing. It is also possible to have the sensors 67 and 68 input into a memory register 72, and this register will, by appropriate counting of the impulses from the synchronizer sensor 67, at the passing of a transport peg 13 and after the frame has commenced to move, switch on the corresponding segment or part of the soldering machine.

At the start of the feeder mechanism 4, a program reader 74 equipped with sensors 75, is situated, which reads a coded strip to obtain the parameters (speed sequence, single or double soldering) provided for the processing of the printed circuit boards. The coded strip is mounted at an appropriate location on each frame 18, 19, 20. These parameters in coded form are routed to the program control station 54. The sensor 77 reports the presence of a frame 18 at the locking bar 31 and activates the program reader 74.

The above described soldering machine operates as follows.

The printed circuit boards to be soldered are fixed into the frames 18, and transported either by conveyor belt 39 or by hand onto the conveyor belt 40 of the feeder mechanism 4.

The frame moves forward until arrested by bolt 34. As soon as the frame sensor 77 senses the presence of the frame, it reports this fact to the program control station 54 and the program reader commences the reading of the program provided for the printed circuit boards and forwards this program to the program control station 54. Once the program is read it is immediately displayed in one of the square fields 1-4, whereupon the desired procedural steps are automatically entered into the program control station 54.

As soon as the program reader 74 is finished with its work, the program control station 54 sends a confirmation impulse to the control circuit 35 for the magnetic activator 32 which removes the bolt 34 from the engaging latch 23 while compressing the spring 33, whereupon the transport belt 40 grabs the frame 18 and takes it into the soldering machine. At the end of the feeding mechanism 4, the cooling blower 48 cools the ingoing piece, particularly in the case of a second soldering operation. The stopping bolt of the locking bar 50 in lock position, is pushed back by the ramp shaped side of the engaging latch and then, because of the force of its spring, snaps into the latch 23. In this way the frame 18, now in position II of the feeder apparatus 4, is held.

If another frame was simultaneously transported onto the conveyor belt 40, this frame is now in the program reading position 1 as illustrated in FIG. 1.

Now when the synchronization sensor 67 has duly reported the passing of the corresponding transport peg 13 and the releasing sensor 68 reported the presence of a frame 18 in the correct position, then an impulse is sent via the control box 70 and the control circuit 51 to the locking bar 50, which now pulls the bolt of the holding mechanism out of its locking position by activating its magnetic anchor, whereupon the frame 18 is moved further on its way by the conveyor belt 40. The appropriate transport peg 13 engages the forward engaging latch 22 and propels the frame according to the rate of movement provided in the program through the soldering machine 2. In order to achieve a sure, secure motion, another transport peg 13 engages the rear engaging latch 22, so that the frame 19 is led through the stations of the soldering machine firmly engaged in two places, as can be seen in FIG. 1. The outputs 1-3 of the memory register or counter 72 initiate the fluxer 25, the dryer 26, the preheater 27 and the soldering station 28 depending on the position of the frames on the machine, so that the printed circuit boards affixed in the frame 19 are exposed to the appropriate procedures.

After the actual soldering of the printed circuit board has been completed by the soldering station 28, the printed circuit board is then cooled by the upward moving air coming from cooling fan 52. If the machine is set for run-through, unidirectional and single soldering operation, the frame 20 is then discharged via the slide chute 8 and removed from the installation.

If the switch 64 is not set for run-through processing as shown in FIG. 1, the drive motor is, after the completed soldering process, reversed at highest speed. The frame with its already soldered printed circuit boards goes back to holding position 50, after which the motor is stopped by a signal from sensor 68.

Here an employee stands and receives the frame with the soldered printed circuit boards. A frame waiting in holding position 31 (locking bar) will be released automatically after the finished frame is removed.

If the switch 65 is in the position "solder twice," the returning frame is stopped at the locking bar 50, re-synchronized, and the above described process is repeated. During this time the hot printed circuit board is cooled by the cooling fan 48.

If the installation is set up for run-through operation via switch 64 and switch 65 is set for double soldering, then the frame is discharged after the second soldering pass by the slide chute 8 to its destination.

In an installation such as this, various pre-programmed soldering parameters are called up through push buttons or automatically. The printed circuit boards, reprogrammable by simple switching, can be soldered twice without the aid of complicated mechanical auxiliary equipment outside of the machine. During waiting times only a minimal amount of energy is used up.

I claim:

1. A continuous soldering installation particularly for the soldering of printed circuit boards, said installation comprising: a soldering machine that includes support means for carrying frames adapted to carry printed circuit boards along a path of travel from a front input end of said support means to a rear output end of said support means, means associated with said support means near the front input end for fluxing printed circuit boards, means associated with said support means for preheating a fluxed printed circuit board and means associated with said support means for soldering fluxed and preheated printed circuit boards; a feeder mechanism for transporting frames that are adapted to carry the printed circuit boards; said mechanism disposed at the front input end of the support means, having at least the length of two frames and being equipped with at least one programmable sub mechanism operatively associated with the feeder mechanism for holding the frame at a holding station; a program controlled trigger mechanism associated with the feeder mechanism and operated by the sub mechanism to release the frame for movement by the feeder mechanism to the soldering machine; a discharge device disposed at the rear output end of the support means; a transfer device traversing the support means for moving frame therethrough; a program controlled variable speed reversible electric motor, which drives at least the transfer device, and which for selective operation of the installation can function in continuous throughput fashion or in a back-and-forth operation; switchboards associated with said installation with relatively operable switches and adjustable regulators for changing soldering parameters and selecting operational modes for said installation; said modes including a simple through processing mode and a back-and-forth processing mode; said soldering parameters including operation levels of said fluxing means and said preheating means, and speed of said soldering means; frames adapted to carry printed circuit boards, each of said frames equipped with a code bearing strip; said feeder mechanism at a front end thereof being equipped with a reading device which reads the code on said strip, said reading device transmitting said code to a program control station, said program control station matching said code with an appropriate routine for processing a printed circuit board attached to said read frame.

2. A continuous soldering installation as set forth in claim 1 also including means associated with said support means for drying a fluxed printed circuit board.

3. A continuous soldering installation as set in claim 1 also including a program controlled dryer means associated with said support means and disposed to act on fluxed printed circuit boards positioned between the means for fluxing printed circuit boards and the means for preheating fluxed circuit boards.

4. A soldering installation as set forth in claim 1 wherein said reversible electric motor includes a fast reverse capability and wherein said back and forth processing mode includes the features of transporting a frame charged with a printed circuit board along a forward path of travel toward the output end of the support means and, after soldering the printed circuit board, switching the reversible electric to fast reverse to transport the frame back to the holding means for removal from the system.

* * * * *